United States Patent [19]

Schneider et al.

[11] Patent Number: 4,842,627
[45] Date of Patent: Jun. 27, 1989

[54] METHOD FOR THE MANUFACTURE OF A PREFORM FOR DRAWING GLASS FIBERS PARTICULARLY INFRARED LIGHT WAVEGUIDES FOR OPTICAL COMMUNICATIONS TECHNOLOGY

[75] Inventors: Hartmut Schneider; Achim Schoberth, both of Muenchen, Fed. Rep. of Germany

[73] Assignee: Siemens Aktiengesellschaft, Berlin and Munich, Fed. Rep. of Germany

[21] Appl. No.: 210,192

[22] Filed: Jun. 20, 1988

Related U.S. Application Data

[63] Continuation of Ser. No. 17,992, Feb. 24, 1987, abandoned.

[30] Foreign Application Priority Data

May 27, 1986 [DE] Fed. Rep. of Germany ....... 3617716

[51] Int. Cl.$^4$ .............................................. C03C 25/02
[52] U.S. Cl. .................................. 65/3.2; 65/12; 65/13; 65/3.11; 65/31; 65/47; 65/48; 264/1.5; 156/663
[58] Field of Search ............ 65/3.11, 3.2, 12, 13, 65/31, 47, 48; 264/1.5; 156/663

[56] References Cited

U.S. PATENT DOCUMENTS

| | | | |
|---|---|---|---|
| 3,899,313 | 8/1975 | Grabmaier et al. | 65/3 |
| 4,061,484 | 12/1977 | Aulich et al. | 65/3.11 |
| 4,248,925 | 2/1981 | Ambrogi | 65/47 |
| 4,519,826 | 5/1985 | Tran | 65/2 |
| 4,571,313 | 2/1986 | Allemand et al. | 264/1.5 |
| 4,631,114 | 12/1986 | Schneider | 65/31 |
| 4,652,288 | 3/1987 | Saito | 65/DIG. 16 |
| 4,659,352 | 4/1987 | Robinson | 65/DIG. 16 |
| 4,659,355 | 4/1987 | Maze et al. | 65/3.12 |
| 4,678,274 | 7/1987 | Fuller | 264/1.5 |

OTHER PUBLICATIONS

Mitachi et al., "Fluoride-Glass Cladded Optical Fibers for Mid-Infra Red Ray Transmission", Electronic Letters (vol. 17, No. 17 8/20/81) pp. 591-592.
"Fluoride Glass Preforms Prepared by a Rotational Casting Process", Electronic Letters (vol. 18, No. 15, 7-22-82), pp. 657-658.
Advances in Mid-Infrared Fibers 100C-ECOC (1985 pp. 13-20), Tran.

Primary Examiner—Arthur Kellogg
Attorney, Agent, or Firm—Hill, Van Santen Steadman & Simpson

[57] ABSTRACT

A method for the manufacture of a preform of barium containing heavy metal fluoride glass comprising a core and a jacket for drawing infrared light waveguides for optical communications technology by casting molten glass onto a predetermined body of solid glass. Hitherto, such a method was executed such that molten core glass was cast into a tube of jacket glass. In order to achieve thicker preforms, one proceeds such here that a solid row of the core glass is surrounded with molten jacket glass. The boundary surface between core and jacket of the generated preform can be improved in the method disclosed herein that the surface of the solid rod is etched before being surrounded with the jacket glass. A nearly perfect boundary surface is obtained by etching with a $ZrOCl_2$ solution.

8 Claims, 3 Drawing Sheets

METHOD FOR THE MANUFACTURE OF A PREFORM FOR DRAWING GLASS FIBERS PARTICULARLY INFRARED LIGHT WAVEGUIDES FOR OPTICAL COMMUNICATIONS TECHNOLOGY

This is a continuation of application Ser. No. 017,992 filed Feb. 24, 1984 now abandoned.

BACKGROUND OF THE INVENTION

1. Field of the Invention:

The invention is directed to a method for the manufacture of a preform for drawing glass fibers, particularly infrared light waveguides for optical communications technology, by casting molten glass onto a predefined body of solid glass.

2. Description of the Prior Art

Infrared light waveguides for optical communications technology are manufactured of oxygen-free, heavy metal fluoride glasses. $ZrF_4$, $HfF_4$ or $TlF_4$ are network-forming agents in these glasses. $BaZr_2$ serves as network converter. The center of gravity in the glass stability lies close to the composition barium fluoro-dizzirconate $BaZr_2F_{10}$. For increasing the glass stability, doping is usually carried out with tri-valent fluorides of the rare earths, for example, with $LaF_3$, $GdF_3$, $YbF_3$ or with $YF_3$, $AlF_3$, for example, with 0 through 20 Molpercent. For example, a typical glass composition is 57 $ZrF_4 \cdot 34$ $BaF_2 \cdot 5$ $LaF_3 \cdot 4$ $AlF_3$. In order to suppress the crystallization tendency, alkkali fluoride, for example, NaF or LiF is also frequently added instead of a part of the $BaF_2$. The general employment of $BaF_2$ as glass component is characteristic.

Fibers of fluoride glass having a stepped refractive index profile are currently manufactured almost exclusively based on the preform method. A glass rod having a core of core glass and a jacket of jacket glass is thereby first prepared, this then being drawn thin to form a fiber. Typical of such glass rods are an outside diameter of 12 mm corresponding to the exterior jacket diameter, a core diameter of 10 mm, a length of 150 mm and a refractive index difference between the core glass and the jacket glass of 0.5 through 1%. The fibers drawn from such a rod have typical outside diameters of 0.1 through 0.2 mm.

As a consequence of the barium content of the glasses, the known CVD methods for the manufacture of preforms of silica glass cannot be applied here. On the contrary, one proceeds via the molten phase which must then be very quickly cooled so that the material solidifies vitreously and crystallization is avoided. The jacket glass is therefore first cast into a cylindrical preform which is usually fabricated of gold-coated brass. By rotation of the form, one then succeeds in forming a tube of jacket glass into which molten core glass can be subsequently filled. This method is known under the term "rotational casting" (cf., in this regard, D.C. Tran, C.F. Fisher, G.H. Sigel, Jr., "Fluoride Glass Preforms Prepared By A Rotational Casting Process", Electronics Lett. 18 (1982) Pages 657–658 and U.S. Pat. No. 4,519,826).

However, crystals or bubbles at the glass boundary surface between core and jacket are frequently found in preforms manufactured in this way. The cause thereof can probably be seen in the aging of the non-cooled inside surface of the jacket glass tube whereby processes such as the absorption of humidity from the atmosphere or the evaporation of melt components participate.

In a second method, the tiltable hollow form is first filled with molten jacket glass and is in turn partially emptied shortly thereafter by being turned over or rotated. This is possible because the molten jacket glass solidifies proceeding from the outer edge toward the inside. Molten core glass is filled in immediately thereafter.

This method is known under the term "build-in casting" (see S. Mitachi, T. Migashita, T. Kanamori, "Fluoride Glass Cladded Optical Fibres For Mid-infrared Ray Transmission", Electron. Lett. 17 (1981) pages 591–592). In this method, the boundary surface is usually less disturbed, but the core diameter greatly deviates from the desired cylindrical form instead.

What the two known methods have in common is the principal of first manufacturing a tube of jacket glass which is then filled out with molten core glass. The heating of the enveloping glass by the core glass can thereby not be avoided. This likewise promotes the crystal growth in the jacket glass. The thermal resistance of the enveloping glass is unfavorable in view of the manufacture of thicker preforms because this prevents the rapid cooling of the central volume.

SUMMARY OF THE INVENTION

An object of the invention is to specify a method of the type described above wherein the problem of rapid cooling of a central volume does not occur and with which thicker preforms can be unproblemmatically manufactured.

This object is achieved in that a solid rod of the core glass is surrounded by a molten jacket glass.

The method of the invention is significantly more favorable in view of the heat elimination because the heat no longer has to be eliminated through the enveloping glass, but can be emitted directly into a surrounding hollow form of material having relatively good thermal conductivity, usually a metal form, or can be eliminated in a stream of cooling gas.

A preferred method of the said species is executed such that the solid rod is introduced into a cylindrical hollow form having a larger cross-section and composed of a material having relatively good thermal conductivity and the annular cavity between the rod and the surrounding hollow form is filled out with the molten jacket glass.

In one embodiment of the invention, the hollow form is preferably composed of metal.

In another preferred development of the method of the invention the molten jacket glass is cast onto the circumferential surface of the solid rod rotating around its axis, being cast thereonto in a stream.

It is thereby advantageous when the molten layer of jacket glass cast onto the solid rod is quenched by a stream of cooling gas.

In accord with another preferred development of the method of the invention, one proceeds such that the solid rod of the core glass is coated by immersion into the molten jacket glass and subsequent removal of the rod.

It is also expedient in this method when the molten jacket glass layer which has remained adhering to the solid rod subsequently withdrawn is quenched by a stream of cooling gas.

In a further embodiment, a stream of cooling gas expediently has a fluorine-containing, hydrogen-free molecular gas and/or a chlorinated hydrocarbon added to it.

Additionally, the solid rod of the core glass can be produced in a simple way by casting molten core glass into a cylindrical hollow form.

It has been found that poor quality glass boundary surfaces between the core glass and the jacket glass also can occur in the method of the invention. It has been found that the cause of this lies in the deficient surface of the solid rod of core glass employed. Such a deficient surface can be productionconditioned, for example, when the solid rod of core glass is produced by casting the molten core glass into a cylindrical hollow form of metal. A fissured and partially crystallized surface arises due to the contact with the metal surface.

Glass boundary surfaces between the core glass and the jacket glass of good quality can be obtained in accord with the invention in that the surface of the solid rod of core glass is etched and is only subsequently surrounded with molten jacket glass.

A nearly perfect glass boundary surface between core glass and jacket glass is achieved when the core glass and the jacket glass are composed of an oxygen-free, heavy metal fluoride glass, at least the core glass containing barium, and the surface of the solid glass rod composed of this core glass is etched with a $ZrOCl_2$ solution.

As a result of the low Rayleigh scattering as well as of the high infrared transparency of these oxygen-free, heavy metal fluoride glasses and of the nearly perfect glass boundary surface between core and jacket, optical fibers of about $2.10^{-2}$ dB/km can be expected given a wavelength of 2550 nm, the manufacture thereof not having yet been successfully carried out (see D.C. Tan: "Advances in Mid-Infrared Fibers", Proc. of the 11th Europ. Conf. Opt. Comm., Venice 1985, Pages 14–20).

Up to now, only short, good fiber sections of less than 1.0 m were obtained because accumulated errors such as bubbles or crystalline inclusions occurred at the boundary surface between core and jacket.

BRIEF DESCRIPTION OF THE DRAWINGS

Exemplary embodiments of the invention shall be set forth in greater detail in the following description with reference to the FIGS. Shown in the FIGS. are.

DESCRIPTION OF THE PREFERRED EMBODIMENTS

Figure 1A:
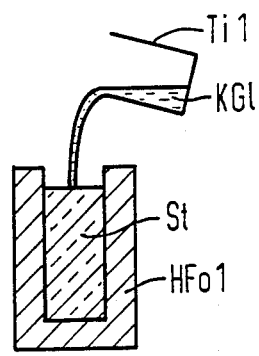
FIGS. 1a–1d–schematically illustrate method steps in the manufacture of a preform with the assistance of a hollow form.

FIG. 1a schematically shows the manufacture of the solid rod of core glass. The molten core glass KG1 produced in a crucible Ti1 of, for example, platinum is cast into a cylindrical hollow form HFo1 of metal shown in vertical section and composed, for example, of gold-coated brass, wherein it rapidly solidifies to form the solid rod St of core glass. The good thermal conductivity of the metal of the block-like hollow form HFo1 sees to this.

Figure 1B:
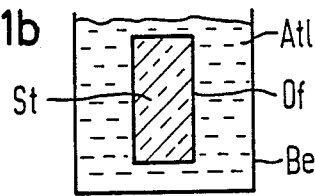

The rod St is removed from the hollow form Hfo1 and its surface, at least its circumferential surface, is etched. In accord with FIG. 1b, for example, this can occur by immersing the rod St into an etching solution Atl situated in a vessel Be, the rod St being allowed to remain therein for a suitable time.

Figure 1C:
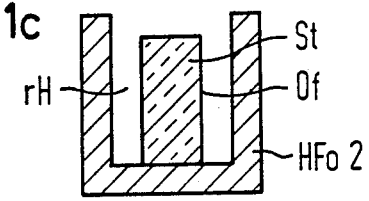

After removal of the etched rod St, it is placed into a cylindrical hollow form HFo2 of metal, for example, of gold-coated brass, which has a larger cross-section and is dried in an inert gas atmosphere (FIG. 1c).

Figure 1D:
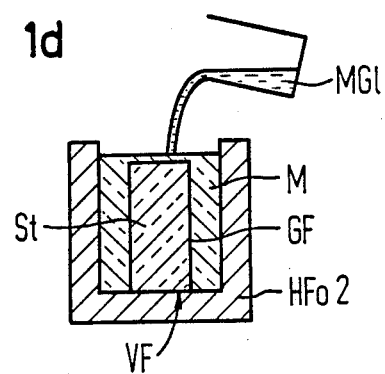

Subsequently, the molten jacket glass MG1 produced in a crucible Ti2 of, for example, platinum is filled into the annular cavity rH between the rod St and the surrounding hollow form HFo2 as shown in FIG. 1d. The temperature of the hollow form Hfo2 is thereby set precisely high enough that the rod St does not splinter. The good thermal conductivity of the metal of the hollow form HFo2 whose mass should be a multiple of the glass mass sees to such a rapid cooling of the jacket glass MG1 that this solidifies to form glass. The finished preform can then be removed from the hollow form HFo2.

For example, a preform of a barium-containing heaving metal fluoride glass for drawing infrared light waveguides was produced with the method just set forth. A glass composition which was composed of ZrHfBaLaAlNa was employed. The composition 53 $ZrF_4$ ·0 $HfF_4$ ·20 $BaF_2$ ·4 $LaF_3$ ·3 $AlF_3$ ·20 NaF was employed for the core glass and the composition 40 $ZrF_4$ ·13 $HfF_4$ ·18 $BaF_2$ ·4 $LaF_3$ ·3 $AlF_3$ ·22 NaF was employed for the jacket glass MG1. The numerical particulars in these two expressions are to be understood as Mol-percentages. In particular, the core glass accordingly contained no Hf.

Temperatures between 850 and 900° C. were used for melting the two glasses in the crucibles. The hollow form into which the molten core or, respectively, jacket glass was cast at a temperature of 700° C. was preheated to 250° C. The block-like hollow forms of gold-coated brass had about four times the mass of the molten glass to be cast into them. What was thereby achieved was that the cast-in, molten glass cooled from 700° C. to 250° C. within one minute and thereby solidified to form glass. The 250° also suffice to keep the rod St from splintering in accord with the step of FIG. 1d. A $ZrOCl_2$ solution was used for etching the rod St composed of the core glass set forth above. A nearly perfect boundary surface GF between the core composed of the rod St and the surrounding jacket M of the preform VF was thereby achieved.

Figure 2:
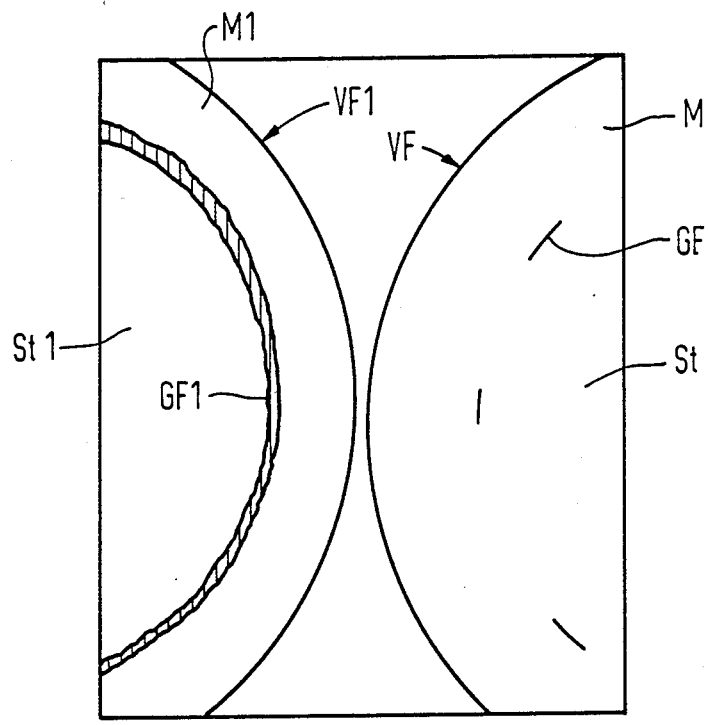
FIG. 2 illustrates portions of magnified cross-sections through two preforms manufactured with the assistance of a hollow form, the left-hand section having been manufactured without etching and the right-hand section having been manufactured with etching.

Portions of ground sections of two preforms VF1 and VF are placed next to one another for comparison in FIG. 2. The preform VF1 was produced in accord with the method set forth above upon omission of the etching step of FIG. 1b. A number of defects composed of bubbles and crystals can be clearly seen at a boundary surface GF1 between the rod St1 and the jacket M1 of this preform VF1.

The preform VF was produced in complete conformity with the method set forth above, i.e. the rod St was etched with $ZrOCl_2$ solution. A boundary surface GF between the rod St and the jacket M can hardly be seen.

The $ZrOCl_2$ etching process for barium-containing heavy metal fluoride glasses has been proposed in U.S. Pat. No. 4,631,114 and shall be set forth in brief here: Barium-containing heavy metal fluoride glasses form a crystalline boundary layer in contact with aqueous acids, this boundary layer being essentially composed of BaF$_2$. The fluoride thereby derives from hydrolyzed fluorozirconic acid. When zirconyl ions, for example, in the form of ZrOCl$_2$·8 H$_2$O salt, are added to the solution, then complexing to form oxylfluoride-zirconic acid ensues. The surface layer disturbed in composition is then dissolved smooth, crystals disappear, the surface is leveled.

Figure 3:
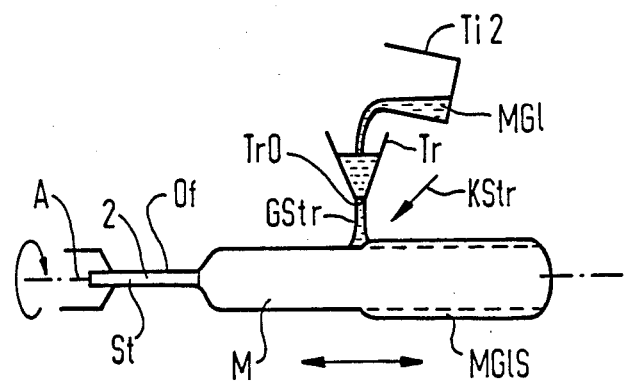
FIG. 3 is a schematic illustration of the preform manufacture by casting the molten jacket glass onto the rotating, solid rod in a stream.

In the development of the method shown in FIG. 3, the solid rod St of core glass is rotated around its horizontal longitudinal axis A and a jacket glass layer is applied to the rotating circumferential surface Of with the assistance of a thin glass stream or jet GStr, whereby the rod St and the glass stream or jet GStr are displaced relative to one another in axial direction. The applied, molten jacket glass layer is quenched to form glass with a cooling gas stream KStr. After the application of such a jacket glass layer, a next jacket glass layer can be applied in the same fashion. It is assumed in FIG. 3 that a plurality of jacket glass layers have already been applied and that a further jacket glass layer MGlS is now being applied to the jacket M already applied.

The glass stream or jet GStr expediently radially directed relative to the rod St can, for example, ensue with the assistance of a funnel Tr axially displaceable relative to the rod St, the molten jacket glass MGl produced in a crucible Ti2 being poured into this funnel Tr and the glass stream GStr emerging from the aperture TrO thereof.

The flow rate of the glass stream GStr is metered such that the applied and still molten jacket glass layer MGlS is quenched to form glass by the cooling gas stream KStr with adequate rapidity. This can occur in that the viscosity of the glass situated in the funnel Tr is controlled. The control can ensue with the assistance of a heating or cooling device (not shown) with which the funnel Tr and the contents thereof are set to a temperature corresponding to the desired viscosity of the glass.

In this method, too, a faultless surface Of of the rod St must first be acquired by etching the rod St.

Expediently, a fluorine-containing, hydrogen-free molecular gas, for example, MF$_3$, SF$_6$ or C$_2$F$_6$ as well or a chlorinated hydrocarbon, for example, CCl$_4$ as well is expediently added to the stream of cooling gas KStr. The residual moisture in the surrounding protective gas atmosphere is diminished in this way by chemical reaction to form hydrogen fluoride.

Figure 4A:
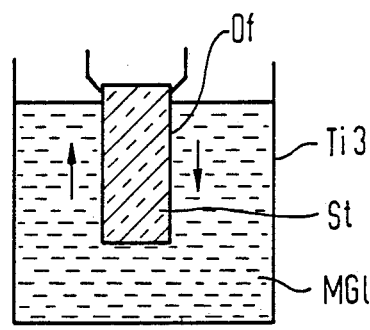
FIGS. 4a and 4b are a schematic illustration of two method steps in the manufacture of a preform by dipping the solid rod into molten jacket glass.
Figure 4B:
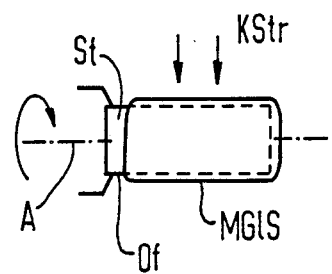

In the method of FIGS. 4a and 4b, the solid rod St of the core glass pre-heated to protect against splintering is dipped into molten jacket glass MGl in a crucible Ti3 of, for example, platinum and is in turn removed therefrom. The jacket glass layer MGlS which remains adhering to the surface Of of the relatively cool rod St after removal and which is at least still partially molten is quenched to glass with adequate rapidity by means of a stream of cooling gas KStr, similar to the method of FIG. 3. As shown in FIG. 4b, the rod St can thereby again be rotated around its axis A. That stated regarding the method of FIG. 3 applies for the stream of cooling gas KStr. A thicker jacket can be produced by repeated immersion and removal.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. In a method for the manufacture of a preform comprising a core of core glass and a jacket of jacket glass for drawing glass fibers by casting molten glass onto a pre-defined body of solid glass, the improvement comprising etching the surface of a solid rod of said core glass and only then surrounding said solid rod of said core glass with molten jacket glass by introducing said solid rod into a cylindrical hollow form having a larger cross-section and composed of material having good thermal conductivity, filling out a resulting annular cavity between said rod and the surrounding hollow form with said molten jacket glass, allowing said molten jacket glass to solidify in said hollow form and subsequently removing the solidified cast member from the hollow form.

2. A method according to claim 1, wherein said hollow form is composed of metal.

3. In a method for the manufacture of a preform comprising a core of core glass and a jacket of jacket glass for drawing glass fibers by casting molten glass onto a pre-defined body of solid glass, the improvement comprising surrounding a solid rod of said core glass with molten jacket glass by rotating said solid rod about its axis and casting molten jacket glass onto the circumferential surface of said solid rod, said casting there onto being in the form of a radial jet.

4. A method according to claim 3, wherein the molten jacket glass layer cast onto said solid rod is quenched by a stream of cooling gas.

5. A method according to claim 4, wherein a gas selected from the group consisting of a fluorine-containing, hydrogen-free molecular gas and a chlorinated hydrocarbon is added to said stream of cooling gas.

6. A method according to claim 1, wherein said solid rod of said core glass is produced by casting molten core glass into a cylindrical hollow form.

7. A method according to claim 6, wherein said core glass and said jacket glass are composed of an oxygen-free, heavy metal fluoride glass; in that at least said core glass contains barium and the surface of said solid rod composed of said core glass is etched with a ZrOCl$_2$ solution.

8. A method for the manufacture of a preform for drawing glass fibers comprising a core of core glass and a jacket of jacket glass comprising the steps of:
   etching a surface of a solid rod of said core glass;
   concentrically introducing said solid rod into a cylindrical hollow form having a cross section larger than that of said rod and being composed of material having good thermal conductivity;
   filling out a resulting annular cavity between said rod and said surrounding hollow form with said molten jacket glass;
   allowing said molten jacket glass to solidify in said hollow form; and
   subsequently removing the solidified cast member from the hollow form.

* * * * *